UNITED STATES PATENT OFFICE.

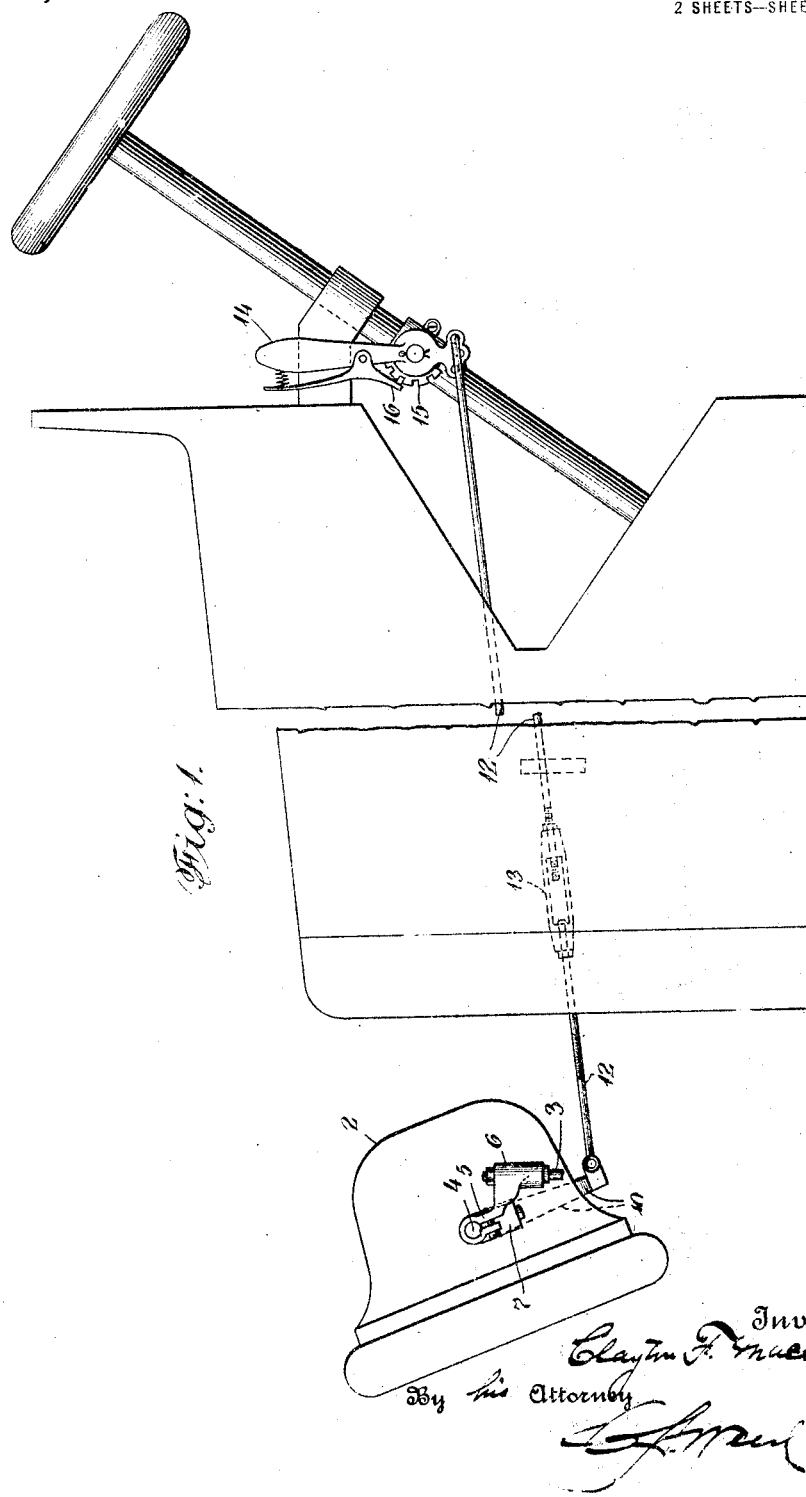

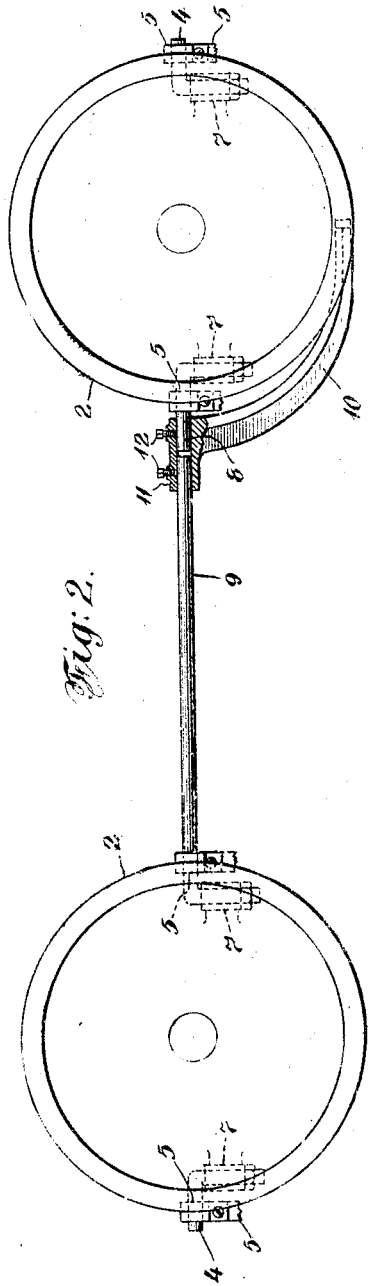
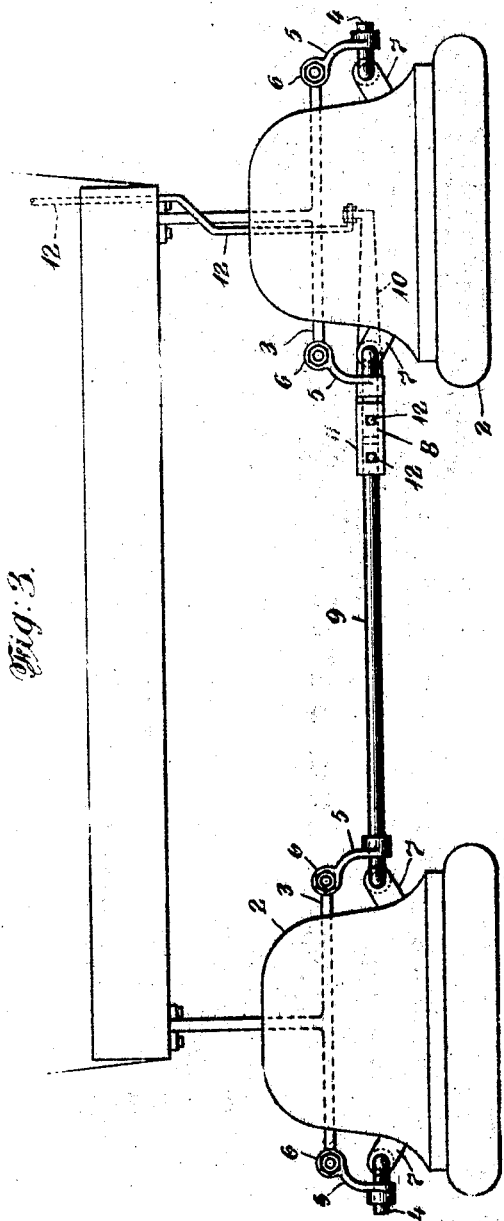

CLAYTON F. MACDONALD, OF CLEVELAND, OHIO.

AUTOMOBILE-HEADLIGHT.

1,315,563.  Specification of Letters Patent.  Patented Sept. 9, 1919.

Application filed October 31, 1916. Serial No. 128,664.

*To all whom it may concern:*

Be it known that I, CLAYTON F. MACDONALD, a citizen of the United States, residing at Cleveland, in the county of Cuyahoga and State of Ohio, have invented certain new and useful Improvements in Automobile-Headlights, of which the following is a specification.

This invention relates to headlights for motor propelled vehicles, such as automobiles, etc., the object of the invention being to provide improved means for quickly and readily tilting the headlights.

It is now a well known fact that the ordinary headlights of automobiles and other motor vehicles are dangerous, owing to the intense glare thereof, not only to pedestrians but to passing vehicles, and various schemes have been evolved for remedying this glare, some by entirely cutting off a portion of the light and directing another portion thereof on to the roadbed, as by covering the bulb or by the use of stationary or swinging deflectors, while other attempts have been to swing the forks and the lamps carried thereby and which necessarily involved more or less complicated mechanism.

The object of the present improvement is to provide a very simple, inexpensive but efficient mechanism by means of which the ordinary lamps may be swung independently of the forks or brackets which support them into different positions, either to throw the light upwardly, or in a horizontal position, or downwardly, the last position being that which is best suited for travel in the city. When the lamps are tilted downward the glare is entirely avoided since all of the rays are directed on to the road.

In the drawings accompanying and forming part of this specification Figure 1 illustrates a side view of the present improvement applied to an automobile with a part thereof broken away; Fig. 2 is a front view thereof; and Fig. 3 is a top view thereof.

Similar characters of reference indicate corresponding parts in the different figures of the drawings.

In the preferred form thereof herein shown and described a pair of headlamps 2 are carried by the usual forks or brackets 3 and for this purpose each lamp is pivotally secured as at 4 to a pair of brackets 5, herein designated as supplemental brackets having sleeved ends 6 fitting the forks of its lamp-carrying bracket.

In the present instance the pivots of each lamp are carried by a pair of projections or lugs 7 and the pivots at the inner side of each lamp are extended to form a pair of rods 8 and 9, one shown longer than the other, and which rods when connected constitute a means for connecting the two lamps for simultaneous movement. Secured to the rods at the meeting ends thereof is a curved bracket or arm 10 having a sleeve 11 and bolts 12 for the reception of the meeting ends of the rods, and by means of which yoke the pivot-rods are so connected that the two lamps will move in unison. The arm is shown as extending under one of the lamps, and its lower end is pivotally connected to a connecting rod 12 extending to the steering-wheel support or column. This connecting rod may be provided with a turn-buckle 13 by means of which the length thereof may be adjusted when desired. The inner end of this rod is secured to a swinging handle 14, suitably mounted upon the steering-wheel column, and the bracket supporting the column and the handle are provided with some suitable means for maintaining the handle in its adjusted position, such for instance as a ratchet and pawl 15 and 16, the ratchet 15 being carried by the bracket and the pawl 16 by the handle. By shifting the handle it will be observed that the lamps may be swung to throw the light upward to read a sign or for use in going up a hill or into a horizontal position, that is, the position in which stationary lamps are usually fixed, or tilted downward to throw the light upon the roadway and prevent the glare from interfering with pedestrians or on-coming vehicles, and it will also be observed that the lamps may be swung at different angles in any of their various positions hereinbefore referred to, according to the necessities of the case and to give the best results. In other words the number of different positions into which the lamps may be tilted is merely determined by the number of notches or the limit to which the handle may be thrown backward or forward. In practice the connecting rod between the lamp-yoke and the handle may extend through the front of the radiator at one side of the vehicle.

From the foregoing it will be observed that I have provided a very simple but nevertheless efficient means for quickly and readily tilting or swinging the ordinary headlights without the necessity of swinging the forks or brackets thereof, or the necessity of providing springs for returning the lamps to any particular position, and that when tilted the lamps may be maintained in such tilted position so that by the addition of a very small expense the ordinary lamp may be readily fitted with this improvement.

It will of course be understood that the various details may be more or less changed without departing from the scope of the present improvement.

I claim as my invention:

1. The combination with a pair of fixed lamp-supporting forks, of a pair of lamps, a pair of supplemental brackets to which the lamps are pivotally connected and which brackets are adapted to fit the forks, two of the pivots of the lamps forming a connecting rod, a curved arm secured thereto, and means for manipulating the arm.

2. The combination with a pair of fixed lamp-supporting forks, of a pair of lamps, a pair of supplemental brackets to which the lamps are pivotally connected and which brackets are adapted to fit the forks, two of the pivots of the lamps forming a connecting rod, a curved arm secured thereto, and means for manipulating the arm and comprising a rod and a handle connected thereto within the vehicle.

3. The combination with a pair of fixed lamp-supporting forks, of a pair of lamps, a pair of supplemental brackets to which the lamps are pivotally connected and which brackets are adapted to fit the forks, two of the pivots of the lamps forming a connecting rod, a curved arm secured thereto, means for manipulating the arm and comprising a rod and a handle connected thereto within the vehicle, and means for maintaining the handle in any desired position.

4. The combination with a pair of fixed lamp-supporting forks, of a pair of lamps, a pair of supplemental brackets to which the lamps are pivotally connected and which brackets are adapted to fit the forks, two of the pivots of the lamps forming a connecting rod, a curved arm secured thereto, means for manipulating the arm and comprising a rod and a handle connected thereto within the vehicle, means for maintaining the handle in any desired position, and means for adjusting the length of the connecting rod.

5. The combination with a pair of lamp supporting forks, of a pair of lamps pivotally connected to the forks for swinging movement, means connecting the lamps for movement in unison and located in substantial alinement with the lamp pivots, and means for swinging the lamps.

6. The combination with a pair of lamp supporting forks, of a pair of lamps pivotally connected to the forks for swinging movement, means connecting the lamps for movement in unison and located in substantial alinement with the lamp pivots, and means connected with said connecting means for swinging the lamp.

7. The combination with a pair of lamp supporting forks, of a pair of lamps pivotally connected to the forks for swinging movement, means connecting the lamps for movement in unison, an arm connected to said connecting means and extending therefrom under one of said lamps, a connector secured to the arm, and means located within the vehicle for shifting the connector.

8. The combination with a pair of lamp supporting forks, of a pair of lamps pivotally connected to the forks for swinging movement, means connecting the lamps for movement in unison and located in substantial alinement with the lamp pivots, an arm connected to said connecting means, and means located within the vehicle for shifting said arm.

9. The combination with a pair of fixed lamp-supporting forks, of a pair of lamps pivotally secured thereto for swinging movement, a pair of the lamp pivots forming an extended connecting rod, means for coupling said pivot-rods together whereby the lamps may be shifted in unison with said coupling and means for shifting the lamp coupling.

10. The combination with a pair of fixed or non-movable lamp supporting brackets, a pair of projecting arms carried by each of said brackets, a pair of lamps, each having horizontally projecting pivots extending into said projecting arms, means connecting said lamps for simultaneous movement, and means running from the lamps to the vehicle for swinging said lamps in a vertical plane simultaneously.

11. The combination with a pair of fixed or non-movable lamp supporting brackets, a pair of projecting arms carried by each of said brackets, a pair of lamps, each having horizontally projecting pivots extending into said projecting arms, means connecting said lamps for simultaneous movement and located in alinement with the pivotal axis of the lamps, and means running from the lamps to the vehicle for swinging said lamps in a vertical plane simultaneously.

12. The combination with a pair of fixed or non-movable lamp supporting brackets, a pair of projecting arms carried by each of said brackets, a pair of lamps, each having horizontally projecting pivots extending into said projecting arms, means connecting said lamps for simultaneous movement and located in alinement with the pivotal axis of the lamps, and means running from the lamps to the vehicle for swinging said lamps in a vertical plane and connected with said lamp connecting means.

13. The combination with a pair of fixed or non-movable lamp supporting brackets, a pair of projecting arms carried by each of said brackets, a pair of lamps, each having horizontally projecting pivots extending into said projecting arms, means connecting said lamps for simultaneous movement and located in alinement with the pivotal axis of the lamps, and means running from the lamps to the vehicle for swinging said lamps in a vertical plane and connected with said lamp connecting means and including a curved arm extending from said connecting means under one of said lamps.

Signed at Cleveland, in the county of Cuyahoga and State of Ohio, this 28 day of October, 1916.

CLAYTON F. MACDONALD.